US011630982B1

United States Patent
Hsu et al.

(10) Patent No.: US 11,630,982 B1
(45) Date of Patent: Apr. 18, 2023

(54) CONSTRAINT-BASED DYNAMIC QUANTIZATION ADJUSTMENT FOR FIXED-POINT PROCESSING

(71) Applicant: Cadence Design Systems, Inc., San Jose, CA (US)

(72) Inventors: Ming Kai Hsu, Fremont, CA (US); Sandip Parikh, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 1252 days.

(21) Appl. No.: 16/131,402

(22) Filed: Sep. 14, 2018

(51) Int. Cl.
*G06N 3/04* (2006.01)
*G06N 3/08* (2006.01)
*G06F 7/544* (2006.01)
*G06F 5/01* (2006.01)

(52) U.S. Cl.
CPC .............. *G06N 3/04* (2013.01); *G06F 5/012* (2013.01); *G06F 7/5443* (2013.01); *G06N 3/08* (2013.01)

(58) Field of Classification Search
CPC ............ G06N 3/04; G06N 3/08; G06F 5/012; G06F 7/5443
See application file for complete search history.

(56) References Cited

U.S. PATENT DOCUMENTS

| 9,916,531 B1* | 3/2018 | Zivkovic | G06N 3/08 |
| 10,678,509 B1* | 6/2020 | Settle | G06F 7/5334 |
| 2016/0328646 A1* | 11/2016 | Lin | G06V 10/454 |
| 2017/0316307 A1* | 11/2017 | Koster | G06F 7/5443 |
| 2018/0285736 A1* | 10/2018 | Baum | G06F 9/30054 |
| 2019/0050710 A1* | 2/2019 | Wang | G06N 3/084 |
| 2021/0350210 A1* | 11/2021 | Gong | G06F 17/16 |

OTHER PUBLICATIONS

Zhou, SC., Wang, YZ., Wen, H. et al. Balanced Quantization: An Effective and Efficient Approach to Quantized Neural Networks. J. Comput. Sci. Technol. 32, 667-682 (2017). (Year: 2017).*

* cited by examiner

Primary Examiner — Ying Yu Chen
Assistant Examiner — Brian J Hales
(74) Attorney, Agent, or Firm — Schwegman Lundberg & Woessner, P.A.

(57) ABSTRACT

Aspects of the present disclosure address systems and methods for fixed-point quantization using a dynamic quantization level adjustment scheme. Consistent with some embodiments, a method comprises accessing a neural network comprising floating-point representations of filter weights corresponding to one or more convolution layers. The method further includes determining a peak value of interest from the filter weights and determining a quantization level for the filter weights based on a number of bits in a quantization scheme. The method further includes dynamically adjusting the quantization level based on one or more constraints. The method further includes determining a quantization scale of the filter weights based on the peak value of interest and the adjusted quantization level. The method further includes quantizing the floating-point representations of the filter weights using the quantization scale to generate fixed-point representations of the filter weights.

20 Claims, 7 Drawing Sheets

CONSTRAINT-BASED DYNAMIC QUANTIZATION ADJUSTMENT FOR FIXED-POINT PROCESSING

TECHNICAL FIELD

The present disclosure generally relates to the technical field of signal processing. In particular, the present disclosure addresses systems and methods for a constraint based dynamic quantization adjustment for fixed-point processing.

BACKGROUND

A popular signal processing application is deep learning. Most modern deep learning models are based on an artificial neural network that "learns" to perform tasks based on a set of training data. Floating-point data types are typically used to represent learning parameters in neural networks. As a result, deep learning applications often have large computational costs in terms of consumption of both memory and processing resources.

Quantization techniques are often used in neural networks to store and calculate numbers in more compact formats. Using these quantization techniques reduces computational resources, which is especially important in applications where computational resources are limited, such as in cellphones, internet of things (IoT) devices, automotive devices, drones, and the like. Generally, neural networks comprise multiple layers—convolution layer(s), normalization layer(s), and activation layer(s). The convolution layers comprise one or more filter weights. Conventional techniques involve quantizing floating-point representations of the filter weights and input data to generate fixed-point data types.

In conventional quantization schemes, quantization levels are fixed based on the number of bits used in the quantization. For example, in conventional quantization schemes, the quantization level for 8-bit quantization is 256. As another example, for 12-bit quantization, the quantization level is 4096. The number of bits (e.g., 16 bits, 12 bits, or 8 bits) used in the quantization is proportional to both the accuracy of the quantization and the computational cost of performing the quantization. In other words, the number of bits used in the quantization impacts both quantization error and the consumption of computational resources.

Hence, reducing the number of bits used in the quantization can cause degradation in the accuracy of the quantization. On the other hand, increasing the number of bits of the quantization increases the consumption of memory and processing resources. For example, conventional quantization techniques that utilize a small number of bits typically have low accuracy or high saturation error in neural networks where there is a wide range of network weights. On the other hand, conventional quantization techniques that utilize a large number of bits typically utilize large amounts of memory and processing resources.

In addition, both computational cost and quantization error are impacted by whether a quantization scheme is symmetric or asymmetric. For example, asymmetric quantization has a lower quantization error compared to symmetric quantization, but symmetric quantization has a lower computational cost than asymmetric quantization.

BRIEF DESCRIPTION OF THE DRAWINGS

Various ones of the appended drawings merely illustrate example embodiments of the present inventive subject matter and cannot be considered as limiting its scope.

DETAILED DESCRIPTION

Figure 1:
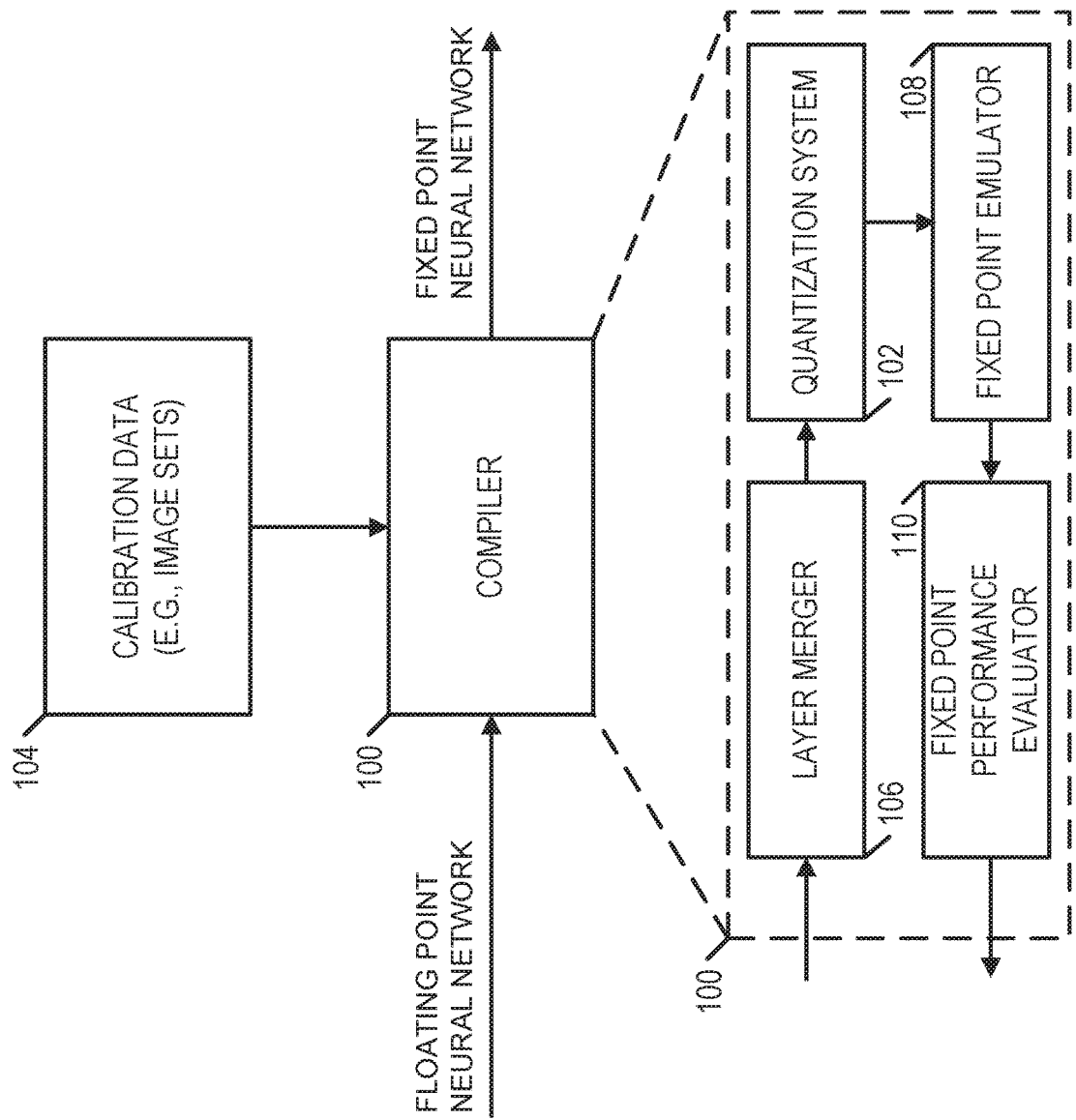
FIG. 1 is a block diagram illustrating an example system in which a quantization system with a dynamic level adjustment scheme may be implemented, according to some example embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Aspects of the present disclosure address the above and other issues within conventional fixed-point quantization techniques by having a quantization system that employs a dynamic quantization level adjustment scheme. That is, rather than performing quantization of floating-point data using a fixed number of quantization levels for a given bit precision, the quantization system dynamically adjusts quantization levels based on constraints.

As will be discussed in further detail below, the quantization system may find particular application in the fixed-point quantization of floating-point neural networks (e.g., neural networks represented using floating-point data types), although the quantization system is not limited to such implementations, and the dynamic quantization level adjustment scheme may be utilized in any quantization process. For example, consistent with some embodiments, the quantization system may access a neural network comprising floating-point representations of filter weights corresponding to one or more convolution layers of the neural network. The quantization system may determine an initial quantization level for the filter weights based on a number of bits in a quantization scheme being employed (e.g., 8-bit or 12-bit quantization). The quantization system dynamically adjusts the initial quantization level based on one or more constraints (e.g., hardware cost, performance, or accuracy), and determines a quantization scale of the filter weights based on a peak value of interest and the adjusted quantization level.

The quantization system may further determine the peak value of interest from the filter weights. The peak value of interest is the largest absolute value included in the filter weights. To generate a fixed-point neural network (e.g., a neural network represented using fixed-point data types), the quantization system quantizes the floating-point representations of the filter weights using the quantization scale to generate fixed-point representations of the filter weights. By adjusting the quantization level, the quantization system is able to lower hardware cost, and improve performance or accuracy as necessitated by design constraints.

The quantization system may apply the above-referenced technique to the neural network on a per-channel basis. In other words, the quantization system may utilize a different quantization level, and thus a different quantization scale, for each output channel of the neural network. By applying the dynamic quantization level adjustment on a per filter (per-channel) basis, the quantization system avoids hardware resource cost and performance issues associated with vector multiply-accumulator (MAC) architecture. For example, the quantization system may adjust the quantization level of each channel to ensure that each channel utilizes the same accumulator shift value and ensure that the content in the accumulator is smaller or equal to a certain value to avoid overflow, thereby allowing for use of an accumulator with a shorter bit length compared to conventional quantization techniques.

It shall be appreciated that the quantization system discussed above and described below may be particularly advantageous when implemented within a digital signal processor (DSP). For example, the quantization system may be utilized to convert floating-point neural networks trained by a graphical processing unit (GPU) to fixed-point neural networks executing on a DSP.

FIG. 1 is a block diagram illustrating an example neural network compiler 100 in which a quantization system 102 with a dynamic level adjustment scheme may be implemented, according to some embodiments. The neural network compiler 100 receives a floating-point neural network (e.g., a neural network represented using floating-point data) as input and generates an optimized fixed-point neural network (e.g., a neural network represented using fixed-point data).

As shown, the neural network compiler 100 receives the floating-point neural network as input along with a configuration of the floating-point neural network. The compiler 100 is generally responsible for generating the fixed-point neural network based on the floating-point neural network. As will be discussed in further detail below, in generating the fixed-point neural network, the compiler 100 may quantize floating-point weights of the floating-point neural network to generate fixed-point weights. The compiler 100 may use calibration data 104 (e.g., image sets) in determining values of interest for input and output data of the fixed-point neural network.

As shown, the compiler 100 comprises a layer merger 106; the quantization system 102; a fixed-point emulator 108; and a fixed-point performance evaluator 110. The layer merger 106 is responsible for merging convolution layers and other types of layers if possible of the neural network.

The quantization system 102 quantizes floating-point data (e.g., neural network input data and weights) into N-bit fixed-point data. With regard to quantization of neural network weights, contrary to traditional quantization systems that use a fixed quantization level for all filter weights across all output channels (e.g., based on the number of bits in the output data), the quantization system 102 employs a dynamic quantization level adjustment scheme whereby quantization levels of weights in each channel may be adjusted to meet constraints (e.g., hardware cost, performance, and accuracy). Further details of the quantization system 102 are discussed below.

The fixed-point emulator 108 emulates a fixed-point implementation of each layer of the input network. The fixed-point performance evaluator 110 evaluates the accuracy of the fixed-point quantization based on results of the emulations performed by the fixed-point emulator 108.

Figure 2:
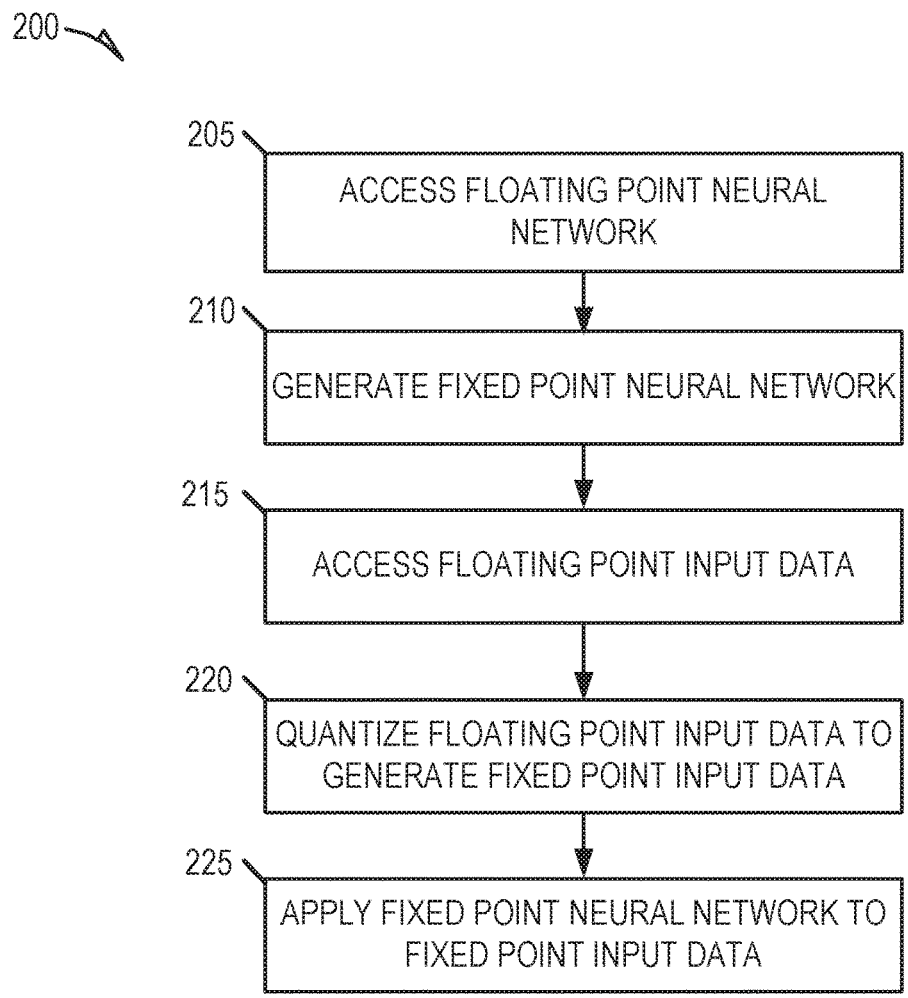
FIG. 2 is a flow chart illustrating a method of applying a quantized network to quantized input data, according to some example embodiments.

FIG. 2 is a flow chart illustrating a method 200 of applying a quantized neural network to quantized input data, according to some example embodiments. The method 200 may be embodied in computer-readable instructions for execution by one or more processors such that the operations of the method 200 may be performed in part or in whole by the neural network compiler 100; accordingly, the method 200 is described below by way of example with reference thereto. However, it shall be appreciated that at least some of the operations of the method 200 may be deployed on various other hardware configurations, and the method 200 is not intended to be limited to the neural network compiler 100.

At operation 205, the quantization system 102 accesses a floating-point neural network comprising one or more convolution layers. Each convolution layer includes multiple filters corresponding to multiple output channels. Each filter has one or more weights (also referred to herein as "filter weights"). The floating-point neural network comprises floating-point representations of the filter weights (also referred to hereinafter as "floating-point filter weights"). Each convolution layer of the neural network has multiple output channels generated by multiple filters.

At operation 210, the quantization system 102 generates a fixed-point neural network based on the floating-point neural network. The fixed-point neural network is a fixed-point representation of the floating-point neural network. The generating of the fixed-point neural network comprises quantizing floating-point filter weights to fixed-point representations of filter weights (also referred to hereinafter as "fixed-point filter weights"). Contrary to conventional quantization systems, the quantization system 102 employs a dynamic quantization level adjustment scheme whereby the quantization level of filter weights in each filter corresponding to each output channel of the neural network may be individually adjusted such that different quantization levels may be used for one or more output channels of the neural network. Further details regarding the generation of the fixed-point neural network are discussed below in reference to FIGS. 3 and 4.

At operation 215, the quantization system 102 accesses floating-point input data. The input data may, for example, include a set of images. At operation 220, the quantization system 102 quantizes floating-point input data to generate fixed-point input data. Further details regarding the quantization of the floating-point input data are discussed below in reference to FIG. 5.

At operation 225, the neural network compiler 100 applies the fixed-point neural network to the fixed-point input data in the fixed-point emulator 108. The application of the fixed-point neural network to the fixed-point input data may comprise performing one or more convolutions on the fixed-point input data using the fixed-point weights of the fixed-point neural network, among other operations (e.g., rectification, pooling, flattening, etc.). Further details regarding the application of the neural network to the fixed-point input data are discussed below in reference to FIG. 6.

Figure 3:
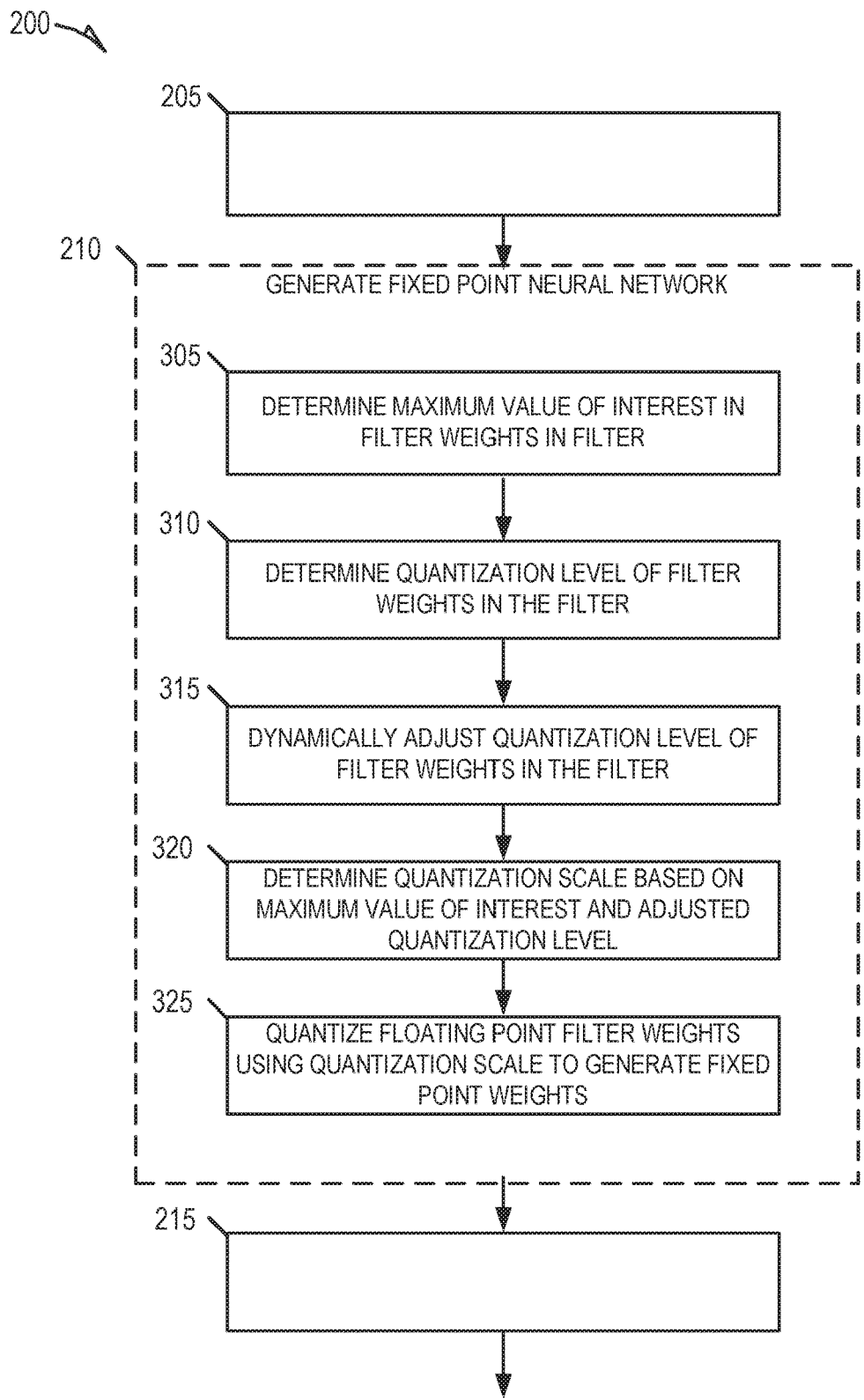
FIG. 3 is a flow chart illustrating a method of fixed-point quantization of a floating-point neural network using dynamic level adjustment, according to some example embodiments.

As shown in FIG. 3, the method 200 may, in some embodiments, include operations 305, 310, 315, 320, and 325. Consistent with these embodiments, the operations 305, 310, 315, 320, and 325 may be performed as part (e.g., a precursor task or subroutine) of operation 210 where the quantization system 102 generates a fixed-point neural network. As noted above, the neural network comprises one or more convolution layers, each of which has multiple filters corresponding to multiple output channels. As illustrated and in the description that follows, operations 305, 310, 315, 320, and 325 address quantization of filter weights in a single filter of a corresponding output channel; however, it shall be appreciated that the operations 305, 310, 315, 320, and 325 are repeated for each output channel of the neural network.

At operation 305, the quantization system 102 determines a peak value of interest in a set of filter weights in a filter of the neural network. Depending on the embodiment, the quantization system 102 may determine the peak value of interest by determining the largest positive value in the set of filter weights or by determining the largest absolute value in the set of filter weights.

At operation 310, the quantization system 102 determines a quantization level for quantizing of the set of filter weights in the filter based on a number of bits in a quantization scheme being employed. For example, in 8-bit quantization, the fixed-point output is an 8-bit number. Thus, with 8-bit quantization, the quantization level is 256, given that with 8 bits there are 256 possible bit patterns.

At operation 315, the quantization system 102 dynamically adjusts (e.g., by increasing or decreasing) the quantization level of the set of filter weights in the filter. The adjusting of the quantization level results in an adjusted quantization level. The quantization system 102 may adjust the quantization level based on one or more design constraints (e.g., hardware cost, performance, and accuracy).

In conventional quantization, quantized convolution results may be greater than the maximum number an accumulator can represent. In these instances, overflow occurs and distorts the results. To deal with overflow in the accumulator(s), accumulator(s) with a larger bit length may be used, such as using 48-bit accumulator instead of 24-bit accumulator, or overflow handling may be added in each summation inside the convolution operation. Both solutions lower the performance. The third possible solution is to ignore the overflow. In this instance, the performance remains the same, but the accuracy may be lowered. An improved approach is to adjust the corresponding quantization level to ensure the convolution results are within the maximum number an accumulator can represent. For example, the quantization system 102 may decrease the quantization level to avoid overflow in one or more accumulators used to store intermediate values resulting from application of one or more convolution layers of the neural network to input data. The quantization system 102 may decrease the quantization level such that the bit length of the one or more accumulators meets certain hardware constraints. Further details regarding this example are discussed below in reference to FIG. 4.

As another example, since the maximum value of interest in each filter is different, the accumulator shift used for each output channel in the convolution layer is different. Unless the vector accumulator shift mechanism is supported in hardware, the performance drops. To add such mechanism in hardware, the cost of hardware is increased. As yet another example, the quantization system 102 may decrease the quantization level to balance the quantization and saturation errors for better accuracy.

At operation 320, the quantization system 102 determines a quantization scale of the set of filter weights in the filter based on the peak value of interest of the filter weights and the adjusted quantization level of the filter. The quantization system 102 may determine the quantization scale by determining a ratio between the adjusted quantization level and the peak value of interest of the filter weights in the filter. For example, the quantization system 102 may determine the quantization scale according to the following:

$$Q_{wi} = \frac{L_{wi}}{R_{wi}}$$

where $Q_{wi}$ is the quantization scale of ith filter, $L_{wi}$ is the adjusted quantization level of the set of filter weights in ith filter, and $R_{wi}$ is the peak value of interest of the set of filter weights in ith filter.

At operation 325, the quantization system 102 quantizes floating-point filter weights in the filter using the corresponding quantization scale determined from the peak value of interest and the adjusted quantization level. In quantizing the floating-point filter weights, the quantization system 102 generates fixed-point filter weights, which are fixed-point representations of the set of filter weights in the filter. For example, the quantization system 102 may multiply a floating-point filter weight by the quantization scale to generate a fixed-point filter weight, as expressed in the following function:

$$Weight_{fixed} = Weight_{floating} * Q_{wi}$$

where $Weight_{fixed}$ is the output fixed-point weight, $Weight_{floating}$ is the input floating-point weight, and $Q_{wi}$ is the quantization scale of ith filter.

As noted above, although operations 305, 310, 315, 320, and 325 address quantization of filter weights from only a single filter, it will be appreciated that operations 305, 310, 315, 320, and 325 can be repeated for each filter. That is, the quantization system 102 may separately determine a peak value of interest, an adjusted quantization level, and a quantization scale of filter weights in each filter and may separately quantize the filter weights of each output channel using the separately determined quantization scales.

Figure 4:
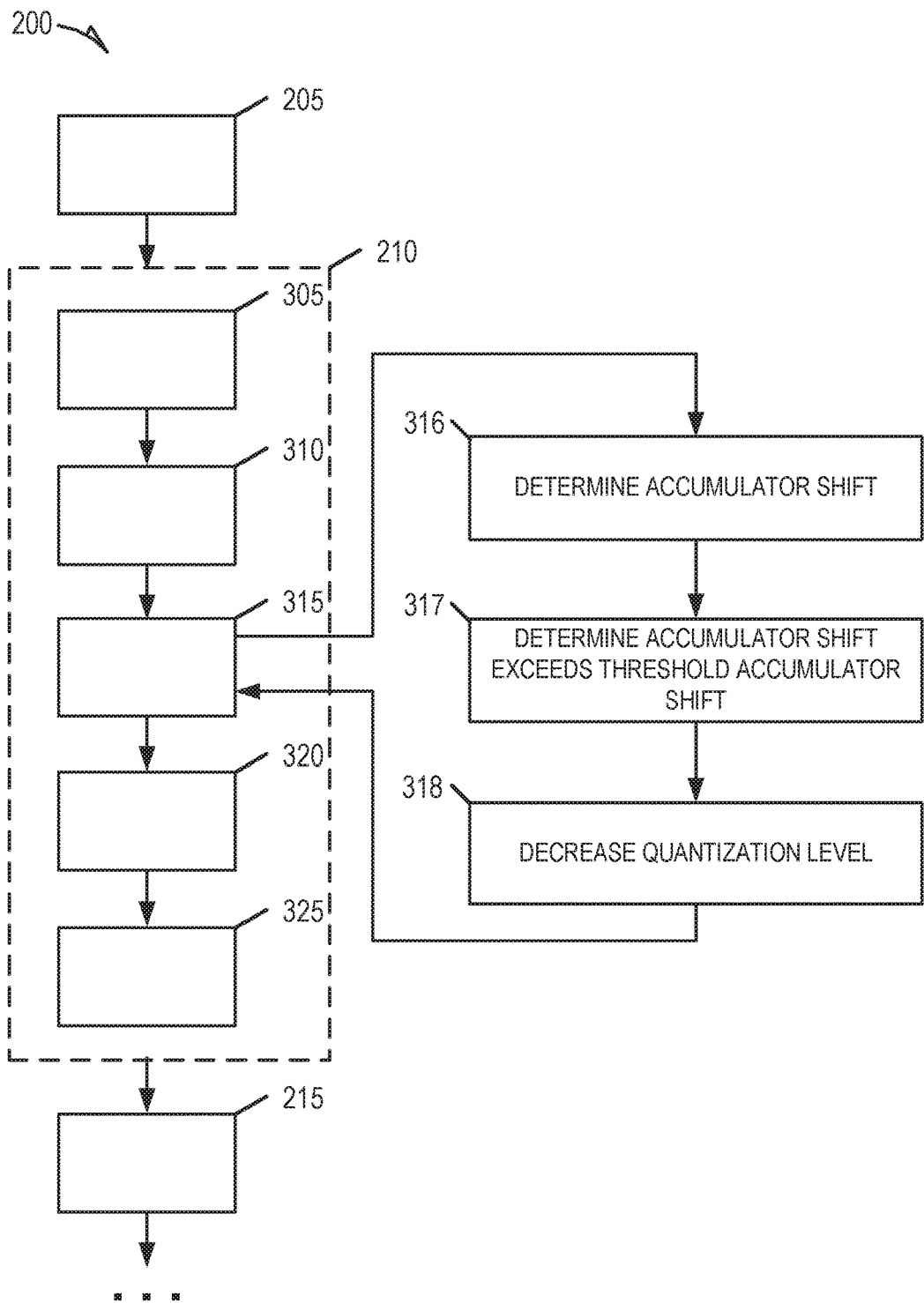
FIG. 4 is a flow chart illustrating a method of dynamic level adjustment in fixed-point quantization, according to some example embodiments.

As shown in FIG. 4, the method 200 may, in some embodiments, include operations 316, 317, and 318. Consistent with these embodiments, the operations 316, 317, and 318 may be performed as part (e.g., a precursor task, a sub-routine, or sub-operations) of operation 315 where the quantization system 102 dynamically adjusts the quantization levels for quantizing the floating-point weights. It shall be appreciated that the operations 316, 317, and 318 are merely examples of operations that may be performed as part of the operation 315, and that the operation 315 is not limited to the operations 316, 317, and 318.

At operation 316, the quantization system 102 determines an accumulator shift value. In each convolution layer of a quantized neural network, the quantization system 102 applies a fixed-point convolution operation to input data and normalizes the convolution results to an appropriate range (e.g., a range value learned from calibration data 104). The summation results in a convolution operation are stored in an accumulator. To apply normalization to the summation results in the accumulator, the results in the accumulator are shifted and transferred to a register with a shorter bit length than the accumulator. The accumulator shift value is used to shift the accumulator content right n bits to fit the bit length of the targeted register and n is determined by the accumulator shift value. Thus, the accumulator shift value corresponds to a number of bit shifts to be applied to the accumulator content.

The quantization system 102 may determine the accumulator shift value based on a peak value of interest of input data, a quantization scale of the input data, the quantization scale of the filter weights in the output channel, and a maximum intermediate data (MID) value (e.g., the maximum possible value extracted from the accumulator to a register that can be represented). For example, the quantization system 102 may determine the accumulator shift value according to the following function:

$$S_i = \left\lceil \log_2\left(\frac{M_d * Q_{wi} * Q_d}{MID}\right) \right\rceil$$

where $S_i$ is the accumulator shift value of ith filter, $M_d$ is the input data peak value of interest, $Q_{wi}$ is the quantization scale of filter weights of the ith filter, $Q_d$ is the quantization scale of the input data, and MID is the MID value.

At operation 317, the quantization system 102 determines that the accumulator shift value exceeds a predetermined threshold. The predetermined threshold may be set based on one or more hardware, performance, or accuracy constraints. For example, the predetermined threshold may be set such that a bit length of the accumulator does not exceed a specific hardware constraint.

At operation 318, the quantization system 102 decreases the quantization level of the set of filter weights of the filter. The quantization system 102 may decrease the quantization level by an amount based on a difference between the accumulator shift value and the predetermined threshold. For example, the quantization system 102 may decrease the quantization level according to an exponential function whose exponential variable is dependent upon the difference between the accumulator shift value and a threshold accumulator shift value. In particular, the quantization system 102 may decrease the initial quantization level according to the following function:

$$Ladj = \frac{Linitial}{2^{S-max\_shift}}$$

where $l_{adj}$ is the adjusted quantization level, $L_{initial}$ is the initial quantization level, S is the accumulator shift value, and max_shift is the predetermined threshold. As noted above, the quantization system 102 may adjust the quantization level to satisfy one or more constraints such as hardware cost, performance, or accuracy.

As noted above, the quantization system 102 may perform the adjustment to the quantization level on a per filter basis. That is, contrary to conventional quantization processes that use the same fixed quantization level for each filter, the quantization system 102 may individually adjust the quantization level for each filter, thereby potentially resulting in a different quantization level for each output channel. In the context of FIG. 4, this means that the quantization system 102 may compute the accumulator shift value for each output channel of the neural network, and a respective accumulator shift value for each channel may be compared with the predetermined threshold to individually determine whether to adjust the quantization level of filter weights in each channel.

In the context of FIGS. 3 and 4, the quantization system 102 determines that the accumulator shift value exceeds the predetermined threshold. However, if the quantization system 102 determines that the accumulator shift value does not exceed the predetermined threshold (not shown), the quantization system 102 may maintain the initial quantization level for the quantization of the input data without adjustment.

Figure 5:
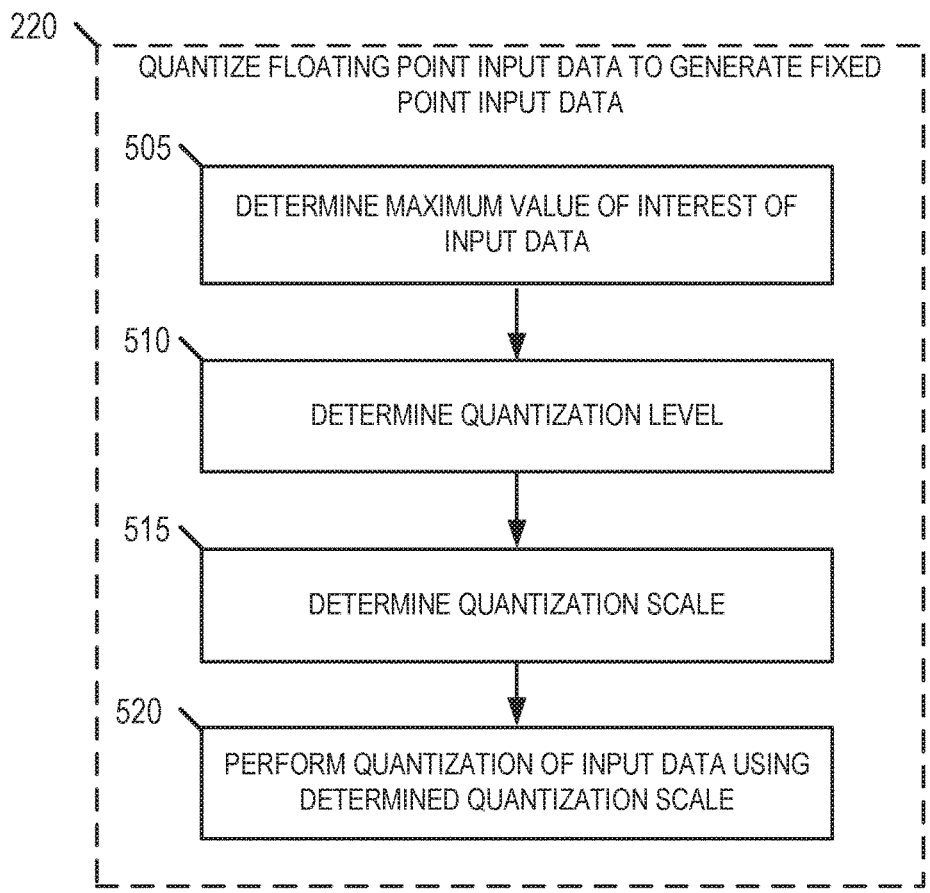
FIG. 5 is a flow chart illustrating a method of quantization of neural network input data, according to some example embodiments.

As shown in FIG. 5, the method 200 may, in some embodiments, include operations 505, 510, 515, and 520. Consistent with these embodiments, the operations 505, 510, 515, and 520 may be performed as part of operation 220 where the quantization system 102 quantizes floating-point input data to generate fixed-point input data.

At operation 505, the quantization system 102 determines a peak value of interest in neural network input data (e.g., image data). The input data initially comprises floating-point data that may, for example, represent one or more images. The quantization system 102 may determine the peak value of interest of the input data based on a calibration data set (e.g., the calibration data 104). Depending on the embodiment, the peak value of interest may be the largest positive value in the calibration data set or the largest absolute value in the calibration data set.

At operation 510, the quantization system 102 determines a quantization level of the input data based on a number of bits in the quantization scheme. For example, as noted above, in 8-bit quantization, the fixed-point output is an 8-bit number. Thus, with 8-bit quantization, the quantization level is 256, given that with 8 bits there are 256 possible bit patterns.

At operation 515, the quantization system 102 determines a quantization scale of the input data based on the peak value of interest and the quantization level. The quantization system 102 may determine the quantization scale by determining a ratio between the quantization level and the peak value of interest. For example, the quantization system 102 may determine the quantization scale according to the following:

$$Qid = \frac{Lid}{Mid}$$

where $Q_{id}$ is the quantization scale of the input data, $L_{id}$ is the quantization level of the input data, and $M_{id}$ is the peak value of interest of the input data.

At operation 520, the quantization system 102 quantizes the floating-point input data using the quantization scale. In quantizing the floating-point input data, the quantization system 102 generates fixed-point input data, which is a fixed-point representation of the input data that was initially represented using floating-point data. For example, the quantization system 102 may multiply the floating-point input data by the quantization scale to generate the fixed-point input data, as expressed in the following function:

$$Input_{fixed} = Input_{floating} * Q_{id}$$

where $Input_{fixed}$ is the fixed-point input data, $Input_{floating}$ is the input floating-point data, and $Q_{id}$ is the quantization scale.

Figure 6:
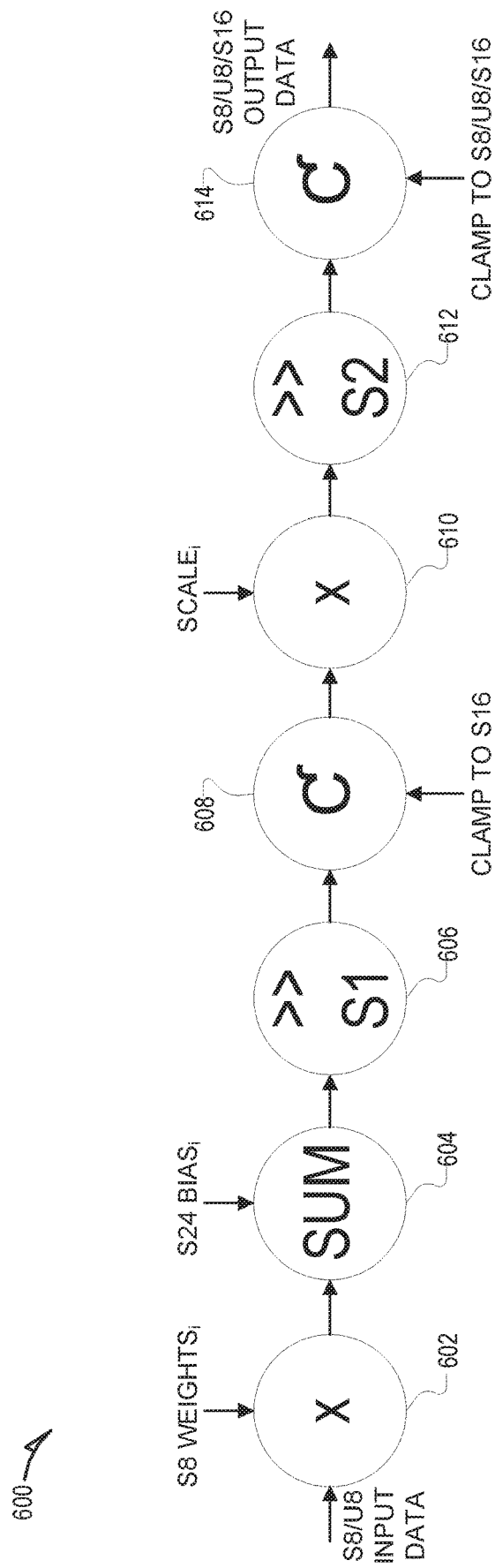
FIG. 6 is a conceptual diagram illustrating an example process of quantized convolution based on fixed-point quantization using dynamic level adjustment, according to some embodiments.

FIG. 6 is a conceptual diagram illustrating an example method 600 of quantized convolution based on fixed-point quantization using dynamic level adjustment, according to some embodiments. The method 600 may be embodied in computer-readable instructions for execution by one or more processors such that the operations of the method 600 may be performed by a computing machine executing a fixed-point neural network; accordingly, the method 600 is described below by way of example with reference thereto. In the context of FIG. 6, the subscript "i" is used to denote ith filter or ith output channel of the fixed-point neural network. Accordingly, although the method 600 is described below for a single output channel of the fixed-point neural network, it shall be appreciated that the method 600 is repeated for each output channel of the neural network.

At operation 602, the fixed-point neural network multiplies input data with fixed-point filter weights of ith filter (e.g., generated at operation 210). In this example, the input data comprises either signed or unsigned 8-bit fixed-point number representations, and the filter weights are signed 8-bit fixed-point number representations.

At operation 604, the fixed-point neural network sums the product of operation 602 with a signed 24-bit bias value. The neural network may determine the bias value for the output channel as follows:

$$Bias = fbias * Qw * Qid$$

where fbias is a bias in floating point. The result of the summation is stored in an accumulator, as discussed above.

At operation 606, the neural network left shifts the result of operation 604 in the accumulator by a first shift value, S1. The neural network may determine S1 based on the accumulator shift value discussed above. If the content in the accumulator is greater than MID discussed above, an accumulator shift is applied to left shift the content in the accumulator by n bit assigned by accumulator shift value. For example, if the content in the accumulator is 18-bit, MID is 16-bit and the accumulator shift value is 2, content in the accumulator is left shifted by 2 bits.

At operation 608, the neural network clamps the result in the accumulator after left shifting the contents n bits. The neural network clamps the result to saturate the content in the accumulator to the MID discussed above. This implies that the content in the accumulator is equal or smaller than MID. In this example, the MID is 16-bit, and thus, the neural network clamps the result of the left shift to a signed 16-bit number representation (e.g., by setting bits in excess of 16 bits to 0 in the accumulator).

At operation 610, the neural network multiplies the intermediate data (e.g., the signed 16-bit number resulting from the clamping) by a scale factor computed for the ith output channel. The scale factor is applied to the intermediate data to normalize the intermediate data with the output data since the intermediate data and the output data have different quantization scales. The neural network may determine the value of the scale factor according to the following equation:

$$Scale_i = \text{Round}\left(\left(\frac{Lod * 2^{S1} * (MID + 1)}{\text{Mod} * Qwi * Qid}\right) + 0.5f\right)$$

where $L_{od}$ is the quantization level of the output data, S1 is the first shift value, MID is the MID value, $M_{od}$ is an output peak value of interest, $Q_{wi}$ is the quantization scale of filter weights of ith filter, $Q_{id}$ is the quantization scale of input data, and f corresponds of fbias discussed above.

At operation 612, the neural network shifts the product of the operation 610 by a second shift value, S2. The neural network may determine the second shift value based on the MID. For example, the neural network may determine the second shift value as follows:

$$S2 = \text{Log}_2(MID + 1)$$

At operation 614, the neural network clamps the result of the second bit shift to one of a signed 8-bit, unsigned 8-bit, or signed 16-bit number based on the peak value of interest in the output data. The neural network provides a signed 8-bit, unsigned 8-bit, or signed 16-bit number as output.

Electronic Apparatus and System

Example embodiments may be implemented in digital electronic circuitry, in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and an apparatus of example embodiments may be implemented as, special-purpose logic circuitry (e.g., a field-programmable gate array (FPGA) or an application-specific integrated circuit (ASIC)).

Figure 7:
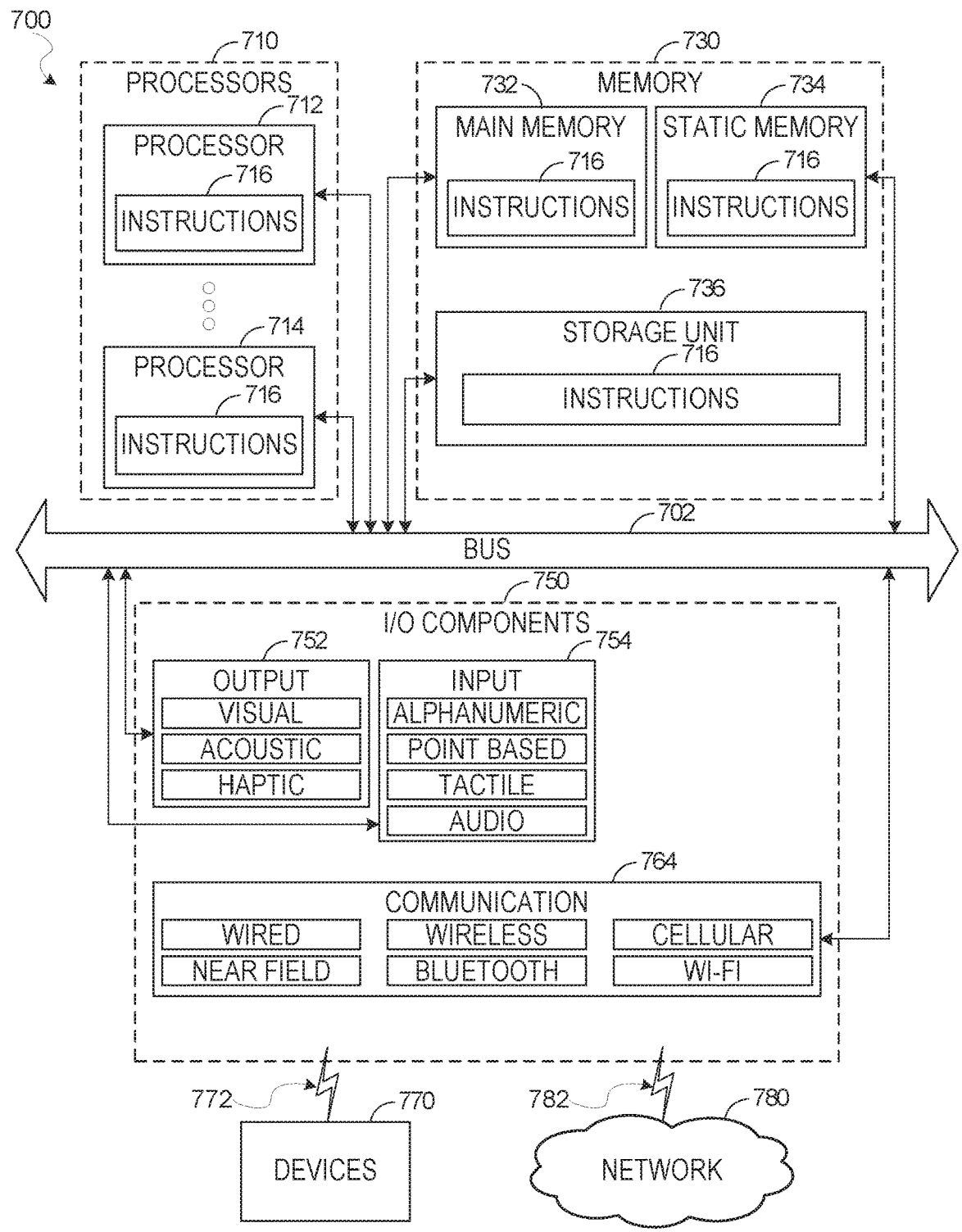
FIG. 7 is a diagrammatic representation of a machine in the example form of a computer system within which a set of instructions for causing the machine to perform anyone or more of the methodologies discussed herein may be stored and executed.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more of the methods 200 or 600. The instructions 716 transform the general, non-programmed machine 700 into a particular machine 700, such as the neural network compiler 100 or the quantization system 102, programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPL), a digital signal processor (DSP), an ASIC, a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute the instructions 716 contemporaneously. Although FIG. 7 shows multiple processors, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 736, each accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides position and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, and other communication components to provide communication via other modalities (e.g., NFC. Bluetooth and WiFi). The devices 770 may be another machine or any of a wide variety of peripheral devices (e.g., a peripheral device coupled via a universal serial bus (USB)).

Executable Instructions and Machine-Storage Medium

The various memories (i.e., 730, 732, 734, and/or memory of the processor(s) 710) and/or storage unit 736 may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium." "device-storage medium." and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "transmission medium" discussed below.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1×RTT), Evolution-Data Optimized (EVDO) technology. General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX). Long Term Evolution (LTE) standard, others defined by various standard-setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of a method may be performed by one or more processors. The performance of certain operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B." unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors; and
   a memory storing instructions that, when executed by the one or more processors, cause the system to perform operations comprising:
   accessing a floating-point neural network trained by a hardware processor, the floating-point neural network comprising floating-point representations of a set of filter weights corresponding to one or more convolution layers;
   determining a peak value of interest from the set of filter weights;
   determining a quantization level for the set of filter weights based on a number of bits in a quantization scheme;
   determining that an accumulator shift value exceeds a threshold value, the accumulator shift value corresponding to a number of bit shifts performed on accumulator content, the accumulator content comprising a summation performed as part of applying one of the one or more convolution layers to input data;
   in response to determining the accumulator shift value exceeds the threshold value, dynamically adjusting the quantization level for the set of filter weights based on one or more constraints, the adjusting of the quantization level comprising decreasing the quantization level according to a decreasing exponential function that is based on a difference between the accumulator shift value and the threshold value, the adjusting of the quantization level resulting in an adjusted quantization level;

determining a quantization scale of the set of filter weights based on the peak value of interest and the adjusted quantization level; and generating a fixed-point neural network to execute on a digital signal processor, the fixed-point neural network comprising fixed-point representations of the set of filter weights by quantizing the floating-point representations of the set of filter weights using the quantization scale.

2. The system of claim 1, wherein:

the set of filter weights is a first set of filter weights corresponding to a first filter of the one or more convolution layers;

the floating-point neural network further comprises floating-point representations of a second set of filter weights corresponding to a second filter of the one or more convolution layers;

the adjusted quantization level is a first adjusted quantization level;

the quantization scale is a first quantization scale; and the operations further comprise:

generating a second adjusted quantization level for the second set of filter weights by adjusting the quantization level that is based on the number of bits in the quantization scheme;

determining a second quantization scale of the second set of filter weights based on the second adjusted quantization level; and quantizing the floating-point representations of the second set of filter weights using the second quantization scale to generate fixed-point representations of the second set of filter weights.

3. The system of claim 1, wherein determining the peak value of interest includes one of:

determining a maximum positive value in the set of filter weights; or determining a maximum absolute value in the set of filter weights.

4. The system of claim 1, wherein determining the quantization scale includes determining a ratio between the peak value of interest and the adjusted quantization level.

5. The system of claim 1, wherein:

the floating-point representations of the set of filter weights comprise a set of floating-point filter weights; and the quantizing of the floating-point representations of the set of filter weights comprises multiplying each floating-point filter weight in the set of floating-point filter weights by the quantization scale.

6. The system of claim 1, wherein the one or more constraints include at least one of a hardware constraint, a performance constraint and an accuracy constraint.

7. A method comprising:

accessing, by one or more processors, a floating-point neural network trained by a hardware processor, the floating-point neural network comprising floating-point representations of a set of filter weights corresponding to a convolution layer;

determining, by the one or more processors, a quantization level for the set of filter weights based on a number of bits in a quantization scheme;

determining that an accumulator shift value exceeds a threshold value, the accumulator shift value corresponding to a number of bit shifts performed on accumulator content, the accumulator content comprising a summation performed as part of applying one of the one or more convolution layers to input data;

in response to determining the accumulator shift value exceeds the threshold value, dynamically adjusting, by the one or more processors, the quantization level for the set of filter weights based on one or more constraints, the adjusting of the quantization level comprising decreasing the quantization level according to a decreasing exponential function that is based on a difference between the accumulator shift value and the threshold value, the adjusting of the quantization level resulting in an adjusted quantization level;

determining, by the one or more processors, a quantization scale of the set of filter weights based in part on the adjusted quantization level; and generating, by the one or more processors, a fixed-point neural network to execute on a digital signal processor, the fixed-point neural network comprising fixed-point representations of the set of filter weights by quantizing the floating-point representations of the set of filter weights using the quantization scale, the fixed-point representations of the set of filter weights comprising a set of fixed-point filter weights.

8. The method of claim 7, further comprising determining a peak value of interest from the set of filter weights, wherein determining the quantization scale is based on a ratio of the peak value of interest and the adjusted quantization level.

9. The method of claim 8, wherein determining the peak value of interest includes one of:

determining a maximum positive value in the set of filter weights; or determining a maximum absolute value in the set of filter weights.

10. The method of claim 8, wherein determining the quantization scale includes determining a ratio between the peak value of interest and the adjusted quantization level.

11. The method of claim 7, further comprising performing quantized convolution on input data using the fixed-point neural network, the performing of the quantized convolution on the input data comprising:

multiplying the input data by the set of fixed-point filter weights;

performing a summation of a product of multiplying the input data by the set of fixed-point filter weights; and shifting a result of the summation by a first shift value determined based on the accumulator shift value.

12. The method of claim 11, wherein:

the shifting of the result of the summation produces a first shifted result; and the method further comprises:

clamping the first shifted result to a bit length of an accumulator, the clamping of the first shifted result producing a clamped result;

multiplying the clamped result by a scale factor, the scale factor determined based in part on the quantization scale of the set of filter weights.

13. The method of claim 7, wherein:
the set of filter weights is a first set of filter weights corresponding to a first filter;
the floating-point neural network further comprises floating-point representations of a second set of filter weights corresponding to a second filter of the convolution layer;
the adjusted quantization level is a first adjusted quantization level;
the quantization scale is a first quantization scale; and
the method further comprises:
generating a second adjusted quantization level for the second set of filter weights by adjusting the quantization level that is based on the number of bits in the quantization scheme;
determining a second quantization scale of the second set of filter weights based on the second adjusted quantization level; and
quantizing the floating-point representations of the second set of filter weights using the second quantization scale to generate fixed-point representations of the second set of filter weights.

14. The method of claim 7, wherein:
the floating-point representations of the set of filter weights comprise a set of floating-point filter weights; and
the quantizing of the floating-point representations of the set of filter weights comprises multiplying each floating-point filter weight in the set of floating-point filter weights by the quantization scale.

15. A non-transitory computer-readable medium storing instructions that, when executed by one or more processors, cause the one or more processors to perform operations comprising:
accessing a floating-point neural network trained by a hardware processor, the floating-point neural network comprising floating-point representations of a set of filter weights corresponding to a convolution layer;
determining a peak value of interest from the set of filter weights;
determining a quantization level for the set of filter weights based on a number of bits in a quantization scheme;
determining that an accumulator shift value exceeds a threshold value, the accumulator shift value corresponding to a number of bit shifts performed on accumulator content, the accumulator content comprising a summation performed as part of applying one of the one or more convolution layers to input data;
in response to determining the accumulator shift value exceeds the threshold value, dynamically adjusting the quantization level for the set of filter weights based on one or more constraints, the adjusting of the quantization level comprising decreasing the quantization level according to a decreasing exponential function that is based on a difference between the accumulator shift value and the threshold value, the adjusting of the quantization level resulting in an adjusted quantization level;
determining a quantization scale of the set of filter weights based on the adjusted quantization level and the peak value of interest; and
generating a fixed-point neural network to execute on a digital signal processor, the fixed-point neural network comprising fixed-point representations of the set of filter weights by quantizing the floating-point representations of the set of filter weights using the quantization scale, the fixed-point representations of the set of filter weights comprising a set of fixed-point filter weights.

16. The non-transitory computer-readable medium of claim 15, wherein:
the set of filter weights is a first set of filter weights corresponding to a first filter of the one or more convolution layers;
the floating-point neural network further comprises floating-point representations of a second set of filter weights corresponding to a second filter of the one or more convolution layers;
the adjusted quantization level is a first adjusted quantization level;
the quantization scale is a first quantization scale; and
the operations further comprise:
generating a second adjusted quantization level for the second set of filter weights by adjusting the quantization level that is based on the number of bits in the quantization scheme;
determining a second quantization scale of the second set of filter weights based on the second adjusted quantization level; and
quantizing the floating-point representations of the second set of filter weights using the second quantization scale to generate fixed-point representations of the second set of filter weights.

17. The non-transitory computer-readable medium of claim 15, wherein determining the peak value of interest includes one of:
determining a maximum positive value in the set of filter weights; or
determining a maximum absolute value in the set of filter weights.

18. The non-transitory computer-readable medium of claim 15, wherein determining the quantization scale includes determining a ratio between the peak value of interest and the adjusted quantization level.

19. The non-transitory computer-readable medium of claim 15, wherein:
the floating-point representations of the set of filter weights comprise a set of floating-point filter weights; and
the quantizing of the floating-point representations of the set of filter weights comprises multiplying each floating-point filter weight in the set of floating-point filter weights by the quantization scale.

20. The non-transitory computer-readable medium of claim 15, wherein the one or more constraints include at least one of a hardware constraint, a performance constraint and an accuracy constraint.

* * * * *